United States Patent [19]
Charng

[11] Patent Number: 5,150,498
[45] Date of Patent: Sep. 29, 1992

[54] WIPER REFILL UNIT WITH IMPROVED CLIP

[75] Inventor: Cedric S. K. Charng, Taipei, Taiwan

[73] Assignee: China Wiper Special Rubber Co., Ltd., Taipei, Taiwan

[21] Appl. No.: 628,493

[22] Filed: Dec. 17, 1990

[51] Int. Cl.$^5$ .............................. B60S 1/04; B60S 1/38; B60S 1/28
[52] U.S. Cl. .................... 15/250.42; 15/250.41
[58] Field of Search .......... 15/250.42, 250.41, 250.31, 15/250.36

[56] References Cited

U.S. PATENT DOCUMENTS

| | | | |
|---|---|---|---|
| 2,782,442 | 2/1957 | Krohm | 15/250.42 |
| 2,983,945 | 5/1961 | De Pew | 15/250.42 |
| 3,153,254 | 10/1964 | Lenz et al. | 15/250.42 |
| 3,233,273 | 2/1966 | Anderson | 15/250.42 |
| 3,626,544 | 12/1971 | Lopez et al. | 15/250.42 |
| 3,707,741 | 1/1973 | Roberts | 15/250.42 |
| 3,808,630 | 5/1974 | Ito | 15/250.42 |
| 3,885,265 | 5/1975 | Deibel et al. | 15/250.42 |
| 4,009,503 | 3/1977 | Sharp | 15/250.42 |
| 4,156,951 | 6/1979 | Sharp | 15/250.42 |
| 4,271,558 | 6/1981 | D'Alba | 15/250.42 |
| 4,360,943 | 11/1982 | Thompson et al. | 15/250.42 |
| 4,388,742 | 6/1983 | Kimber et al. | 15/250.42 |
| 4,389,747 | 6/1983 | Riester | 15/250.42 |
| 4,442,566 | 4/1984 | Sharp | 15/250.42 |
| 4,501,043 | 2/1985 | Plisky | 15/250.42 |
| 4,583,259 | 4/1986 | Will | 15/250.42 |
| 4,679,276 | 7/1987 | Tomkin | 15/250.42 |

FOREIGN PATENT DOCUMENTS 0232598 11/1986 European Pat. Off. .
0327233 1/1989 European Pat. Off. .
2038169 12/1979 United Kingdom .

Primary Examiner—Harvey C. Hornsby
Assistant Examiner—Gary K. Graham
Attorney, Agent, or Firm—Howson & Howson

[57] ABSTRACT

A refill unit for removable attachment to a wiper blade superstructure having a set of claw members. The refill unit comprises an elongate backing strip for carrying at least one flexible wiping element and having outwardly extending side flanges adapted to be slidably received by the claw members and a clip detachably securable at different selected positions along the length of the backing strip. The clip has spaced apart resiliently deflectable legs each of which has latching means with outwardly projecting feet interengageable with a selected one of a number of longitudinally spaced apart apertures formed in an elongate central portion of the backing strip between the side flanges thereof, such that the clip is not inadvertently dislodged from the strip.

12 Claims, 2 Drawing Sheets

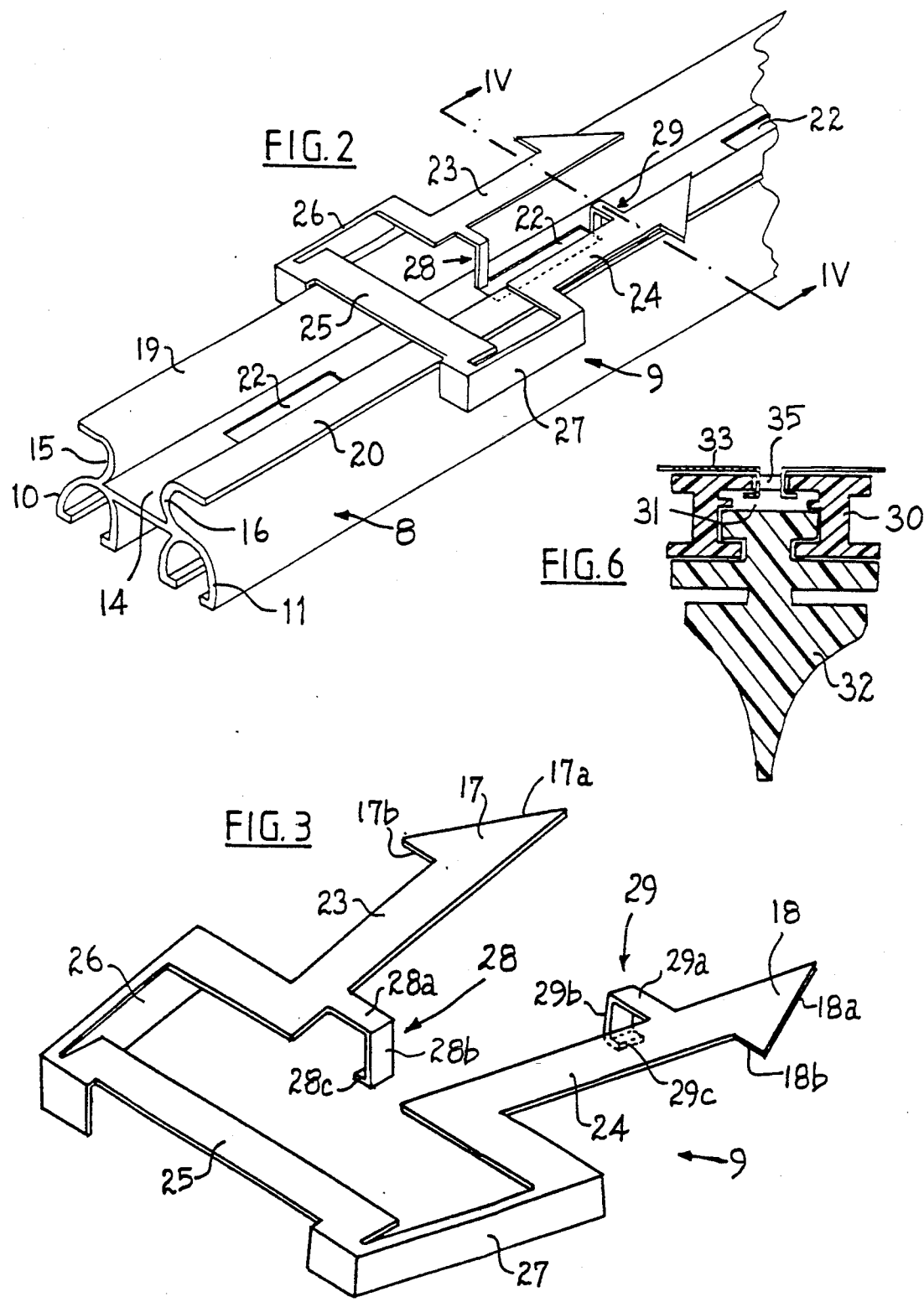

WIPER REFILL UNIT WITH IMPROVED CLIP

BACKGROUND OF THE INVENTION

This invention relates to a refill unit for removable attachment to a wiper blade superstructure. More particularly the refill unit is intended for attachment to any one of a number of wiper blade superstructures of different size or length. The invention also relates to a clip for the refill unit.

Certain wiper blade assemblies comprise a wiper blade superstructure having a set of claw members for enabling attachment thereto of a wiper blade unit including an elongate flexible backing strip and an elongate resilient wiping element received in an elongate slot of the backing strip. Some such wiper blade units are designed for a specific size of wiper blade superstructure. For example often the distance between the endmost claw members at opposite ends of the wiper blade superstructure is only slightly less than the length of the backing strip. In such cases, the wiper blade unit normally includes an end clip which is detachably secured to one end of the backing strip to enable an endmost claw member to be releasably fastened to the end clip to resist sliding of the backing strip relative to the wiper blade superstructure. Examples of such wiper blade units are shown in Sharp U.S. Pat. No. 4,009,503, Sharp U.S. Pat. No. 4,156,951 and Thomson & Scotcher U.S. Pat. No. 4,360,943. Other such wiper blade units, however, are considerably longer than the distance between the two endmost claw members at opposite ends of the wiper blade superstructure and in such cases it is not feasible to use conventional end clips for releasably attaching the backing strip to one of the endmost claw members. Such wiper blade assemblies are referred to as "short frame" blade assemblies.

The wiper blade superstructures of known short frame blade assemblies are produced in different sizes. It is known to provide a single length refill unit for use with a number of different size wiper blade superstructures. Such known refill units generally include a claw-engaging clip which is detachably securable at different positions along the length of the backing strip. Examples of such known refill units are shown in Kimber & Norris U.S. Pat. No. 4,388,742, Riester U.S. Pat. No. 4,389,747, Sharp U.S. Pat. No. 4,442,566, Plisky U.S. Pat. No. 4,501,043, Baerenwald, Mohnach & Plisky U.S. Pat. No. 4,566,147 and Will U.S. Pat. No. 4,583,259. Another known refill unit is shown in Kessler & Mayer U.S. Pat. No. 4,571,770 and employs an end clip with spacers positionable between the end clip and the endmost claw member. Although some of these known refill units disclose the use of resilient clips having engaging means engaging in selected ones of longitudinally spaced apart apertures formed in an elongate central portion of a backing strip, none of the engaging means are in the form of latching members which extend from resiliently deflectable spaced apart legs of the clip.

SUMMARY OF THE INVENTION

An object of the present invention is to provide a new and improved refill unit for a wiper blade superstructure.

Another object of the present invention is to provide a refill unit which is simple to manufacture and simple for user's to fit to, or remove from, a wiper blade superstructure.

Another object of the present invention is to provide a refill unit which can be fitted to different sized wiper blade superstructures.

A yet further object of the present invention is to provide a refill unit comprising a one piece elongate backing strip having a pair of spaced apart parallel channels for receiving a pair of spaced apart squeegee elements.

According to one aspect of the present invention there is provided a wiper refill unit for removable attachment to a wiper blade superstructure having a set of claw members, the refill unit comprising:

an elongate flexible backing strip having at least one slot means defining at least one elongate slot for receiving at least one elongate resilient wiping element;

an elongate side flange extending along each side of the backing strip, the two side flanges being intended in use to be slidably received and retained by the set of claw members of the wiper blade superstructure; and an elongate central portion disposed between said side flanges and provided with a number of aperture means spaced apart in the elongate direction; and a clip having a pair of spaced apart resiliently deflectable legs intended in use to overlie respective ones of said side flanges, each leg having latching means extending therefrom interengageable with a selected one of said aperture means for detachably securing the clip at a selected position on the backing strip thereby enabling, when the set of claw members receive and retain the backing strip, releasable fastening of one of the claw members of the wiper superstructure to the clip to resist sliding of the backing strip relative to the set of claw members.

Conveniently the backing strip is made of extruded plastics material.

Suitably two slot means are provided defining two spaced apart parallel elongate slots for receiving, respectively, two spaced apart parallel wiping elements. In this case the elongate central portion is conveniently in the form of a web interconnecting the two slot means.

Preferably the latching means of one clip leg is disposed forwardly of the latching means of the other clip leg. Thus if the legs are resiliently deflected towards each other, the latching means of one clip leg do not interfere with the latching means of the other clip leg. Preferably each aperture means comprises an elongate slot dimensioned to receive both latching means of the clip when the latter is secured to the backing strip at a selected position. Preferably, the latching means of one clip leg interengages with a selected slot at one end of the latter and the latching means of the other clip leg interengages with the selected slot at the other end of the latter. The opposite ends of the selected slot therefore prevent longitudinal movement of the clip within the selected slot.

Suitably the clip further comprises a transversely extending body portion intended in use to overlie the side flanges of the backing strip and, at opposite ends of the body portion, downwardly extending side portions to which the legs are respectively connected. Conveniently the body and side portions straddle the backing strip with the side portions being resiliently pressable together to resiliently urge the legs towards each other. Conveniently the legs diverge from each when in an unbiased condition and are moved into less diverging relative positions on resiliently pressing the side portions together.

According to another aspect of the present invention there is provided a metal clip adapted to be detachably secured to an elongate flexible backing strip of a wiper blade unit, the clip having spaced apart resiliently deflectable legs each of which has latching means extending therefrom for interengagement with a selected one of a number of longitudinally spaced apart aperture means formed in an elongate central portion of the backing strip between spaced apart elongate side flanges of the backing strip.

BRIEF DESCRIPTION OF THE DRAWINGS

The invention will now be described, by way of example, with particular reference to the accompanying drawings, in which:

FIG. 2 is a perspective view, on an enlarged scale, of one end of the refill unit shown in FIG. 1 and illustrating a clip detachably secured to a backing strip;

FIG. 3 is a schematic perspective view, on an enlarged scale, of the clip shown in FIG. 2;

FIG. 6 is a sectional view through an alternative embodiment of wiper refill unit according to the present invention.

DESCRIPTION OF THE PREFERRED EMBODIMENTS

Figure 1:
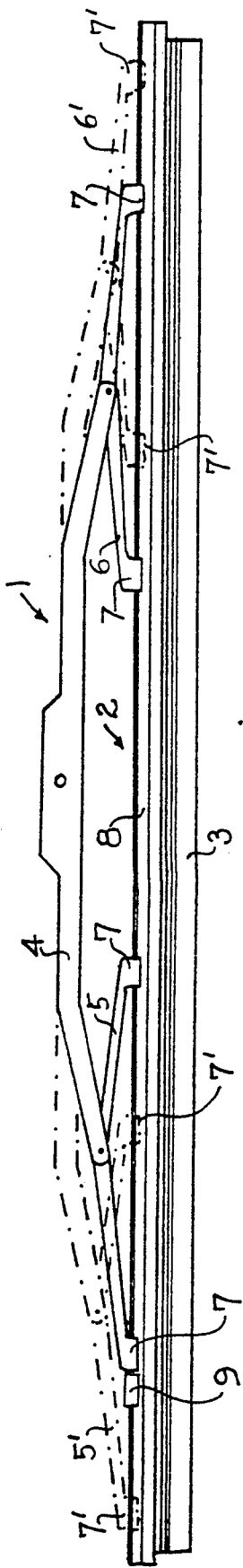
FIG. 1 is a side view of a wiper refill unit according to the present invention removably attached to differently sized wiper blade superstructures, a short superstructure being shown in full lines and a long superstructure being shown in chain lines.
Figure 4:
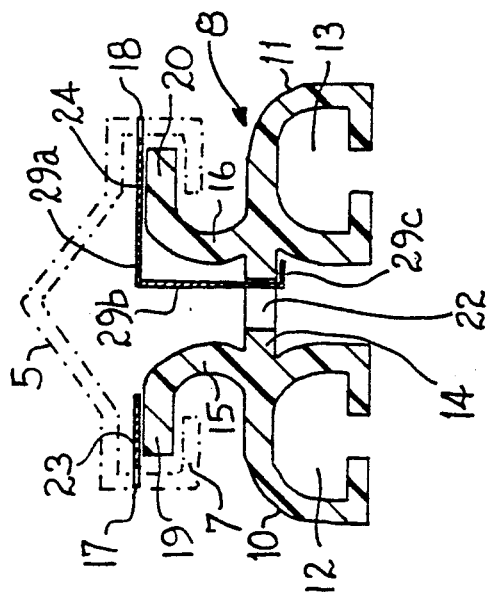
FIG. 4 is a sectional view taken on the line IV—IV of FIG. 2.
Figure 5:
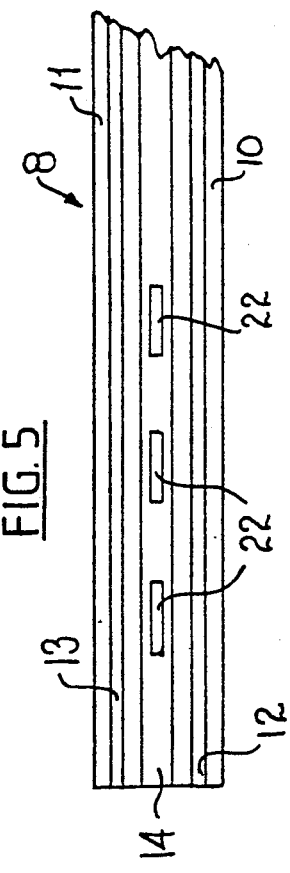
FIG. 5 is a view from below, on a reduced scale, of one end of the backing strip shown in FIG. 2.

FIG. 1 shows a wiper blade assembly comprising a wiper blade superstructure, generally designated 1, and a refill unit, generally designated 2, removably attached to the superstructure 1 and carrying a pair of spaced apart elongate resilient wiping elements 3 (only one of which can be seen in FIG. 1). Two differently sized wiper blade superstructures 1, each of the short frame type, are shown in FIG. 1, the smaller size superstructure being shown in full lines and the larger size superstructure being shown in chain lines. Each superstructure 1 comprises a primary yoke 4 with secondary yokes 5 and 6 (or 5' and 6' for the larger superstructure) pivotally connected to opposite ends thereof. Opposite ends of each secondary yoke are provided with claw members 7 (or 7' for the larger superstructure). The wiper blade superstructure may be of any known design, the invention primarily being directed to refill units for removable attachment to any of a number of different designs of wiper blade superstructure.

The refill unit 2 is shown in more detail in FIGS. 2-8 and comprises an elongate one-piece flexible backing strip 8 extruded from plastics material and a metallic clip 9. The backing strip 8 has a pair of spaced apart, generally parallel elongate channel portions 10 and 11 extending from end to end of the backing strip and defining downwardly open elongate slots 12 and 13, respectively, for slidably receiving bead portions of the wiping elements 3. An elongate central portion or web 14 joins the channel portions 10 and 11 and upstanding elongate portions 15 and 16 join the bases of channel portions 10 and 11, respectively, to outwardly extending elongate side flanges 19 and 20, respectively. The side flanges 19 and 20 lie generally in a common plane parallel substantially parallel to the web 14. Although not shown, one or both ends of each channel portion 10 and 11 may be crimped or otherwise deformed to retain the wiping elements in the slots 12 and 13. A plurality of elongate slots 22 are also formed in the web 14 after extrusion of the backing strip, the slots 22 being longitudinally spaced apart from each other. In the drawings three such slots 22 are shown but other numbers of slots, i.e. only two or more than three such slots, could be provided instead.

The metal clip 9 is best shown in FIG. 3 and comprises a pair of generally L-shaped resiliently deflectable legs 23 and 24, a transversely extending body portion 25 lying in a common plane with the legs 23 and 24 and downwardly depending side portions 26 and 27 joining the legs 23 and 24, respectively, to opposite ends of the body portion 25. The front end portions of the legs 23 and 24 are provided with latch portions 17 and 18, respectively, which have rearwardly and outwardly sloping surfaces 17a and 18a and lateral latch surfaces 17b and 18b, respectively. Latching members 28 and 29 extend from the legs 23 and 24, respectively, each latching member having an inwardly extending part 28a (29a) lying in the same plane as the legs, a downwardly extending part 28b (29b) extending generally perpendicular to the inwardly extending part 28a (29a) and an outwardly extending latch part 28c (29c) generally parallel to the inwardly extending part 28a (29a). The latching member 28 is arranged towards the rear end of the long arm of the L-shaped leg 23 and latching member 29 is arranged towards the front of the long arm of the L-shaped leg 24. In the normal condition of the clip 9 shown in FIG. 3 when it is not attached to the backing strip 8, the side portions 26 and 27 diverge outwardly and forwardly as do the long arms of the L-shaped legs 23 and 24.

In use the latching members 28 and 29 are interengaged with a selected slot 22 in the backing strip 8. The slot 22 selected will depend on the size of the wiper blade superstructure to which the refill unit is to be removably attached. For example, with the short frame superstructure 1 shown in full lines in FIG. 1, the innermost slot 22 would be selected. On the other hand for the superstructure shown in chain lines in FIG. 1, the outermost slot 22 would be selected. By appropriate slot selection, the refill unit when attached to the superstructure will project approximately equal distances from opposite ends of the superstructure.

In order to detachably secure the clip 9 to the backing strip 8, the side portions 26 and 27 are manually pressed together between finger and thumb so that the legs 23 and 24 are resiliently moved towards each other sufficiently far to enable the latch parts 28c and 29c to pass between the side walls of the selected slot 22. The clip 9 is positioned with its base portion 25 overlying the side flanges 19 and 20 and the downwardly extending portions 28b and 29b extending between the elongate portions 15 and 16 and passing between the side walls of the selected elongate slot 22. On releasing the pressure on the side portions 26 and 27, the legs 23 and 24 spring apart so that the portions 28 and 29 abut against the side walls of the selected slot 22 and the latch parts 28c and 29c are located against the downwardly facing surface of the web 14 outwardly of the selected slot 22. The latching member 28 is at the rear of the selected slot 22 and the latching member 29 is at the front of the selected slot 22 thereby preventing any substantial longitudinal movement of the clip 9 relative to the backing strip 8. The clip 9 is now removably secured to the backing strip 8 in the position shown in FIGS. 2 and 4. If it is desired to release the clip 9 at this stage, all that is required to be done is to resiliently press the side portions 26 and 27 together so that the latch parts 28c and 29c can pass unobstructed between the side walls of the selected slot 22 and to lift the clip 9 from the backing strip.

The refill unit is now ready to be removably attached to the wiper blade superstructure 1. This is achieved by sliding the backing strip 8 through the claw members 7 in a conventional manner. When the endmost claw member 7 reaches the clip 9, it deflects the legs 23 and 24 resiliently inwards as it rides over the sloping surfaces 17a and 18a before the legs snap apart with the claw member retained against the latch surfaces 17b and 18b (see FIG. 1).

By enabling different slots 22 to be selected for attachment of the clip 9 to the backing strip 8, the refill unit can be easily adapted to fit differently sized wiper blade superstructures. The side flanges 19 and 20 are not unduly weakened by the provision of cut outs therein and it is relatively simple to form the slots 22 at end regions of the backing strip 8. The clip 9 can be easily stamped in a single piece from sheet metal and subsequently be bent to the desired form.

Although the invention has been described heretofore with reference to a dual wiper blade refill unit, it will be appreciated that the invention may also find application with single wiper blade refill units. FIG. 6 shows one such application in which a backing strip 30 is provided with a single elongate slot 31 for receiving a single wiping element 32. A clip 33, similar to clip 9 but having shorter downwardly extending portions 28b and 29b, overlies the backing strip 30 and has its latching members engaged in a selected one of a number of spaced apart elongate slots 35 formed in a central part of the backing strip. As shown, the section of FIG. 6 is taken through the rearmost latching member in contrast with FIG. 4 in which the section is taken through the front latching member 29. A clearance is provided between the bottom of the slot 31 and the wiping element 32 to prevent the latter interfering with the clip 33.

It is to be understood that the invention is not considered to be limited to the precise details and constructions set forth in this specification and modifications may be made within the scope of the appended claims.

I claim:

1. A wiper refill unit for removable attachment to a wiper blade superstructure having a set of claw members, the refill unit comprising:
    an elongate flexible backing strip having
        at least one slot means defining at least one elongate slot for receiving at least one elongate resilient wiping element;
        an elongate side flange extending along each side of the backing strip, the two side flanges being intended in use to be slidably received and retained by the set of claw members of the wiper blade superstructure; and
        an elongate central portion disposed between said side flanges and provided with a plurality of aperture means spaced apart in the elongate direction, said central portion including parts which surround each said aperture means; and
    a clip having a body portion and a pair of spaced apart legs extending in opposed, spaced relationship to each other from said body portion, said legs being resiliently deflectable toward and away from each other and being positionable to overlie respective ones of said side flanges, each leg having latching means extending therefrom which project through a selected one of said aperture means, the latching means on each leg being positioned thereon in spaced relationship to the body portion whereby, when said legs are deflected toward each other, the latching means on each leg approaches the opposite leg, and said latching means having means respectively projecting outwardly beneath the central portion in opposite directions such that engagement of said outwardly projecting means with said central portion holds the clip in engagement with the backing strip unless the legs are squeezed toward each other to allow said outwardly projecting means to pass through said selected aperture means, whereby the clip can be detachably secured at a selected position on the backing strip, thereby enabling, when the set of claw members receive and retain the backing strip, releasable fastening of one of the claw members of the wiper superstructure to the clip to resist sliding of the backing strip relative to the set of claw members, and whereby the clip is prevented from accidental removal from the backing strip even when the backing strip is not secured to claw members of the wiper superstructure.

2. A wiper refill unit according to claim 1, in which the backing strip has two slot means defining two spaced apart parallel elongate slots for receiving, respectively, two spaced apart parallel wiping elements.

3. A wiper refill unit according to claim 2, in which the elongate central portion is in the form of a web interconnecting the two slot means.

4. A wiper refill unit according to claim 1, in which each aperture means comprises a slot, elongated in the direction of elongation of the backing strip, and dimensioned to receive both latching means of the clip when the latter is secured to the backing strip at a selected position.

5. A wiper refill unit according to claim 1, in which the body portion further comprises downwardly extending side portions at opposite ends of the body portion to which the legs are respectively connected.

6. A wiper refill unit according to claim 5, in which the legs diverge from each when the clip is in an unbiased condition and are moved into less diverging relative positions on resiliently pressing the side portions together.

7. A wiper refill unit according to claim 1 having at least one elongate resilient wiping element slidably received in said at least one slot means.

8. A wiper refill unit according to claim 7 in which the outwardly projecting means of said latching means project laterally beneath one of the parts of said central portion of the backing strip which surrounds said selected one of said aperture means.

9. A wiper refill unit according to claim 1 in which the outwardly projecting means of said latching means project laterally beneath one of the parts of said central portion of the backing strip which surrounds said selected one of said aperture means.

10. A wiper refill unit for removable attachment to a wiper blade superstructure having a set of claw members, the refill unit comprising:
   an elongate flexible backing strip having
      at least one slot means defining at least one elongate slot for receiving at least one elongate resilient wiping element;
      an elongate side flange extending along each side of the backing strip, the two side flanges being intended in use to be slidably received and retained by the set of claw members of the wiper blade superstructure; and
      an elongate central portion disposed between said side flanges and provided with a plurality of aperture means spaced apart in the elongate direction, said central portion including parts which surround each said aperture means; and
   a clip having a pair of spaced apart resiliently deflectable legs intended in use to overlie respective ones of said side flanges, each leg having latching means extending therefrom which project through a selected one of said aperture means and outwardly beneath the central portion for detachably securing the clip at a selected position on the backing strip, thereby enabling, when the set of claw members receive and retain the backing strip, releasable fastening of one of the claw members of the wiper superstructure to the clip to resist sliding of the backing strip relative to the set of claw members, each aperture means comprising a slot, elongated in the direction of elongation of the backing strip, and dimensioned to receive both latching means of the clip when the latter is secured to the backing strip at a selected position; and
   the latching means of one clip leg being disposed forwardly, in the direction of elongation of the backing strip, of the latching means of the other clip leg.

11. A wiper refill unit according to claim 10, in which the latching means of one clip leg interengages with a selected slot at one end of the latter and the latching means of the other clip leg interengages with the selected slot at the other end of the latter.

12. A metal clip adapted to be detachably secured to an elongate flexible backing strip of a wiper blade unit for securing the latter to a wiper blade superstructure, said backing strip having a pair of elongated, spaced-apart side flanges and an elongated central portion between said side flanges, and having at least one aperture in said central portion, the clip having a body portion and a pair of spaced apart legs extending in opposed, spaced relationship to each other from said body portion, said legs being resiliently deflectable toward and away from each other in a plane, each of said legs having latching means extending therefrom, the latching means on both legs extending in a direction transverse to said plane and to the same side of said plane and being positioned on said legs in spaced relationship to said body portion whereby, when said legs are deflected toward each other, the latching means on each leg approaches the opposite leg, and said latching means each having means providing an outwardly extending portion for engaging said central portion of the backing strip, said outwardly extending portions extending in opposite directions, whereby the latching means can both extend through said aperture, the said outwardly extending portion of each latching means can engage the central portion of the backing strip to prevent accidental removal of the clip from said backing strip even when the backing strip is not attached to the claws of the wiper superstructure, and said clip can be removed from the backing strip by squeezing its legs together.

* * * * *